Sept. 25, 1962 F. J. MECHAM 3,055,229
SELF CLEARING CONVEYOR BELT PULLEY
Filed May 25, 1959

INVENTOR:
FERRIS J. MECHAM
BY
Homer C. Montague
ATTORNEY

United States Patent Office 3,055,229
Patented Sept. 25, 1962

3,055,229
SELF CLEARING CONVEYOR BELT PULLEY
Ferris J. Mecham, Reno, Nev., assignor to Sierra Engineering Co., Inc., Reno, Nev., a corporation of Nevada
Filed May 25, 1959, Ser. No. 815,670
6 Claims. (Cl. 74—230)

This invention is concerned with pulleys such as are used with belt conveyors, either as drive or idler pulleys, and aims to provide a pulley of novel built-up construction that will exhibit improved traction against the belt, relatively light weight, and which will be substantially self clearing to allow clods, gravel or lumps of other material to be discharged freely, and thus to avoid undue wear and damage of the belt and the pulley.

Belt conveyors invariably permit a certain amount of the conveyed material to fall onto the inner surface of the lower stretch of the belt, and a portion of this will usually find its way to one of the end pulleys and be drawn between the belt and the pulley surface. Where the material is hard, sharp or lumpy, damage to the conveyor belt and/or pulley can easily result. The invention aims to minimize this damage, as well as to provide ancillary advantages.

It is further an object of the invention to provide a pulley having the above characteristics but which can be readily fabricated at considerably less cost than with other types of construction. Since the entire body of the pulley is formed of sheet metal shapes connected by welded joints, its manufacture can be effected efficiently by the use of suitable sheet metal equipment and jigs, rather than requiring large metal working lathes and similar machines.

Briefly, the pulley of the invention is formed as an assembly of sheet metal shapes providing an inner core whose surface slants downwardly, from a central plane transverse to the pulley axle, to facilitate the discharge of any material falling thereon. Extending radially outward from the surface of this core are a number of fin-like sheets spaced angularly about the axle and lying in planes generally parallel to the axle. The outer longitudinal edge of each fin or blade is also slanted both ways from a maximum height at the central plane, to provide a crown, but preferably of less taper than that of the core surface. Each such outer fin edge is preferably bent over marginally to define an adequate contact surface for the belt, while allowing free passage, into the space between fins, of lumps or such material carried into the pulley. The absence of a smooth or extensive contact surface prevents wear and tear on the belt by large pieces of material, without in any way sacrificing adequate traction. As a matter of fact, under comparable conditions, the new pulley actually provides improved traction on the belt despite its lower contact area relative to a conventional smooth pulley.

A preferred form of the invention is shown in the appended drawings, in which.

Figure 1:
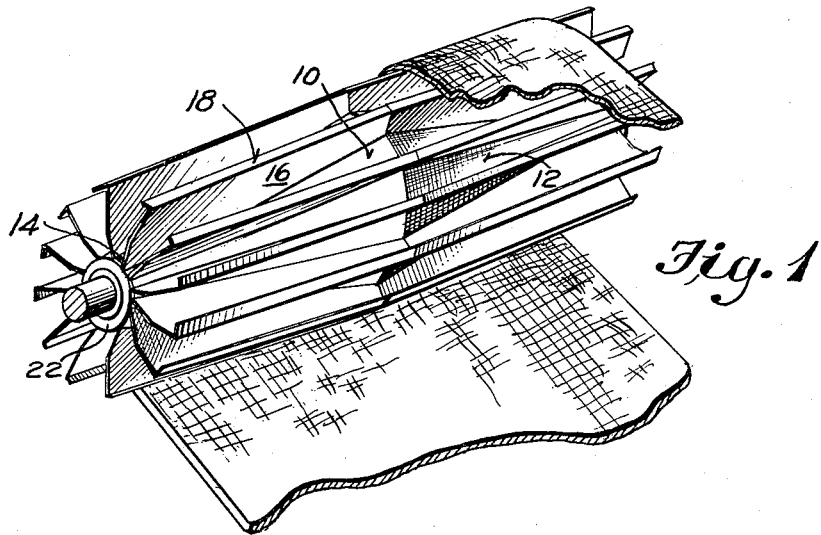
FIGURE 1 is a perspective view of the novel pulley, shown associated with a conveyor belt which is partly broken away.

The body of the completely fabricated pulley, as shown in FIGURE 1, exhibits a central core surface as at numerals 10 and 12, conforming in a general way to two cones butted together at their bases in the central plane transverse to the pulley axis. Actually, as better shown in FIGURE 2, the surfaces 10 and 12 result from the juxtaposition of the lower flanges such as 14, which are formed by bending from the central upstanding web portion 16 of each vane half. Also, the upper margin of each vane half is flanged as at 18, the totality of these flanges forming the belt-contacting outer surface of the pulley. The complete pulley as shown in FIGURE 1 requires 24 vane halves, 12 each of the right-hand and left-hand type, as will be clear from an inspection of the drawings. However, a different number of parts may be used, depending upon the size and application of the pulley.

Figures 2, 3:
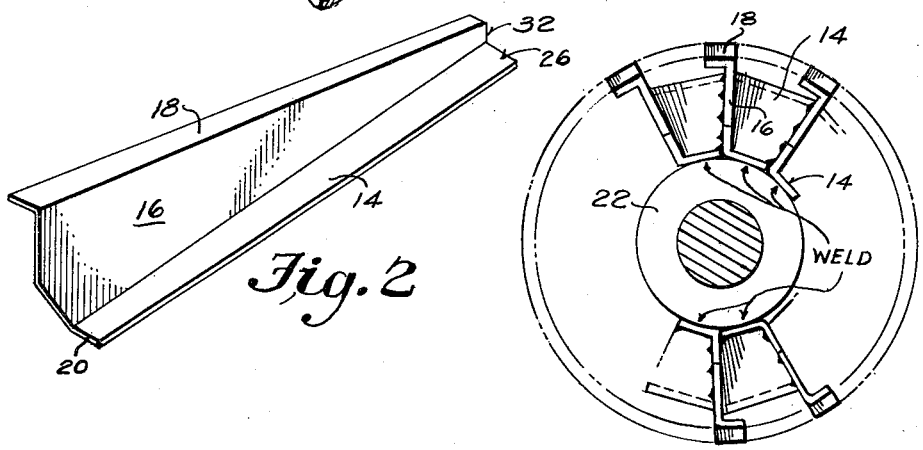
FIGURE 2 is a perspective view, to a larger scale, of a single half vane or fin which enters into the construction of the novel pulley.
FIGURE 3 is an end view showing diagrammatically two typical vane sections as will be described.

The longitudinal edges of adjacent flanges 14 are welded to one another in a circular series as indicated in FIGURE 3, and in the region at each end of the pulley the extremities 20 of the flanges 14 are all welded to a central hub of metal, such as indicated at 22. The hub may include a suitable anti-friction bearing, or a taper bushing shaft-lock or the like as at 24.

Figure 4:
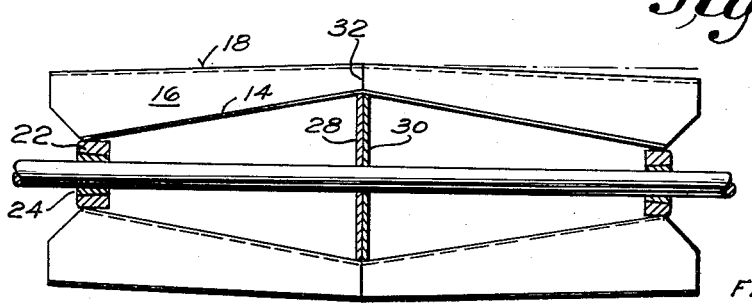
FIGURE 4 is a longitudinal sectional view of the pulley, taken through the main and central shaft axis thereof.

Conveniently, the two halves of the pulley may be independently assembled, by welding the vane portions together as described, and then welding all of the inner margins 26 of the flanges 14 to the periphery of a stiffening plate such as indicated at 28 and 30 in FIGURE 4. These two pulley halves may then be assembled with their large ends together, and the plates 28 and 30 edge-welded together to form a single assembly. The upstanding proximate vertical flange edges 32 will finally also be welded to one another, and the edges 20 welded to the hubs 22 if this was not already done.

It will be seen from the foregoing that the slant of the surfaces 10 and 12 of the pulley core, as well as the slant or crown of the outer or belt-contacting surface of the pulley, are readily established by the shaping and tapering of the vanes themselves, and that only straight bends are required, such as can readily be made with simple bending tools of the sheet metal trade. The pulley can thus be manufactured at low cost in any quantity, and provides an extremely rigid and efficient structure having the various advantageous features already described herein.

While the invention has been described in some detail in order to disclose the same completely so that those skilled in this art can practice the invention, it will be recognized that various changes can be made in the details without departing from the scope of the invention as defined in the appended claims.

What is claimed is:

1. A pulley for conveyor belts or the like, comprising a central core formed as a double frustum tapering outwardly along the pulley axis from the central plane toward each end of the pulley, a stiffening plate member positioned transversely to said pulley axis secured to the central core at the central plane thereof, and a plurality of fin-like sheet metal radial blades, each secured to and extending outwardly from the core surface continuously from end to end of the pulley, said blades having their outer margins located to define a quasi-cylindrical belt contact locus.

2. A pulley in accordance with claim 1, in which the outer edge of each blade is also slanted, from the central plane toward each end of the pulley, to define a centrally crowned belt contact locus.

3. A pulley in accordance with claim 1, in which the outer margin of each blade is flanged to provide an increased area of belt contact.

4. A pulley for conveyor belts or the like, comprising a central core formed as a double frustum of blade flanges welded to one another and tapering outwardly along the pulley axis from the central plane toward each end of the pulley, a stiffening plate member positioned transversely to said pulley axis secured to the central core at the central plane thereof, and a plurality of fin-like flat sheet metal radial blades, each integral with one of the blade flanges and extending continuously from end to end of the pulley, said blades having their outer margins located to define a quasi-cylindrical belt contact locus.

5. A pulley in accordance with claim 4, in which the outer marginal edge of each blade is also slanted, from the central plane toward each end of the pulley, to define a centrally crowned belt contact locus.

6. A pulley in accordance with claim 4, in which the outer margin of each blade is flanged to provide an increased area of belt contact.

References Cited in the file of this patent
UNITED STATES PATENTS

| | | |
|---|---|---|
| 1,194,589 | Barry | Aug. 15, 1916 |
| 1,196,922 | Black | Sept. 5, 1916 |
| 2,157,301 | Neuman | May 9, 1939 |
| 2,232,623 | Neuman | Feb. 18, 1941 |
| 2,320,163 | Anderson | May 25, 1943 |
| 2,339,069 | Gemeny | Jan. 11, 1944 |
| 2,808,730 | Shank | Oct. 8, 1957 |
| 2,913,150 | Seale | Nov. 17, 1959 |